C. Purdy,
Band Saw Mill.

No. 106,960.  Patented Aug. 30, 1870.

Witnesses.

Inventor.
C. Purdy
per
Alexander Mason.
Attys

United States Patent Office.

CHESTER PURDY, OF BEDFORD, OHIO.

Letters Patent No. 106,960, dated August 30, 1870.

IMPROVEMENT IN SAW-MILLS.

The Schedule referred to in these Letters Patent and making part of the same.

*To all whom it may concern:*

Be it known that I, CHESTER PURDY, of Bedford, in the county of Cuyahoga and State of Ohio, have invented certain new and useful Improvements in Band Sawing-Machines; and I do hereby declare that the following is a full, clear, and exact description thereof, reference being had to the accompanying drawing and to the letters of reference marked thereon, making a part of this specification.

The nature of my invention consists in the construction and arrangement of shields or guides to two-wheel band-saws, to prevent sawdust, &c., from coming in between the saw and lower wheel, and also in the construction and arrangement of an adjustable saw-table.

In order to enable others skilled in the art to which my invention appertains to make and use the same, I will now proceed to describe its construction and operation, referring to the annexed drawing, in which—

A represents a frame, to which the several parts composing the machine are attached.

B B are wheels or drums, upon which the saw D is hung, said saw being of the kind known as an endless or band-saw.

The upper wheel or drum is made to adjust to suit the length of saw and track in any suitable manner.

C represents an adjustable table through a slot in which the saw D passes, and upon which the lumber to be cut is held while being operated upon by the saw.

This table may be elevated or turned at any angle required, and held by means of a circular bar, E, attached to its under side, said circular bar bearing against a pin, *a*, placed on the upper side of the circle, and directly beneath, in line of the pivot or angular piece H, of the frame A, upon which the table is hinged.

On either side of the saw and directly under the table is placed a guard or shield, F, for the purpose of preventing sawdust from passing between the saw and wheel, and making uneven surface to the driving-wheel, upon which the saw is hung.

This shield or guard F consists of a slotted piece of sheet metal, the sawing passing in the slot, and the shield forming an inclined groove on both sides of the saw, to carry off the sawdust.

An angular piece extends from the upper inner end of the said shield, by means of which it is secured either to the saw-table or to the frame of the machine, as may be most convenient.

G is also a guard or shield between the table and driving-wheel, so constructed as to prevent any sticks or dust from passing between the saw and wheel.

The shield G is curved, covering the top and front of the lower roller B, having a slot near its front end, through which the saw passes, and is secured in any suitable manner to the frame of the machine.

At the point where the saw passes the shield it is intended to be faced with wood or leather, or any flexible material, so as to prevent the saw-teeth from touching the metal. This guard may be made of wood or metal. The same object will be accomplished in either case.

Figure 1:
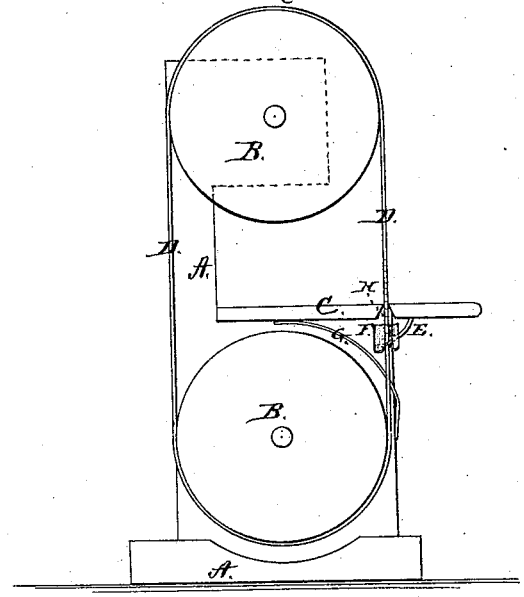
Figure 1 is a side elevation of my machine.
Figure 2:
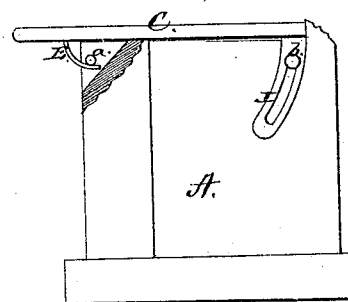
Figure 2 is a view of the opposite side of the machine, showing the manner of adjusting the saw-table.

To the under side of the table C is attached a curved slotted bar, I, as shown in fig. 2, for holding the table at any desired angle.

A screw or bolt, *b*, passes through this slot, and connects it to the frame. By tightening the bolt the table is held in position.

The lower one of the wheels B is the driving-wheel, to which power is communicated in the usual manner.

Having thus fully described my invention,

What I claim as new, and desire to secure by Letters Patent, is—

1. The slotted guard or shield F, constructed as described and placed between the table and wheel, so as to have an inclined groove on either side of the saw, substantially as and for the purposes herein set forth.

2. The curved and slotted guard or shield G, constructed as described and placed between the saw and the wheel, substantially as and for the purposes herein set forth.

3. The combination of the two guards or shields F and G, constructed substantially as described and for the purposes set forth.

4. The combination of the table C, pivot H, circular bar E, slotted bar I, and screw-bolt *b*, all arranged substantially as and for the purposes herein set forth.

In testimony that I claim the foregoing, I have hereunto set my hand this 28th day of December 1869.

C. PURDY.

Witnesses:
L. P. TARBELL,
L. TARBELL.